United States Patent Office 2,750,942
Patented June 19, 1956

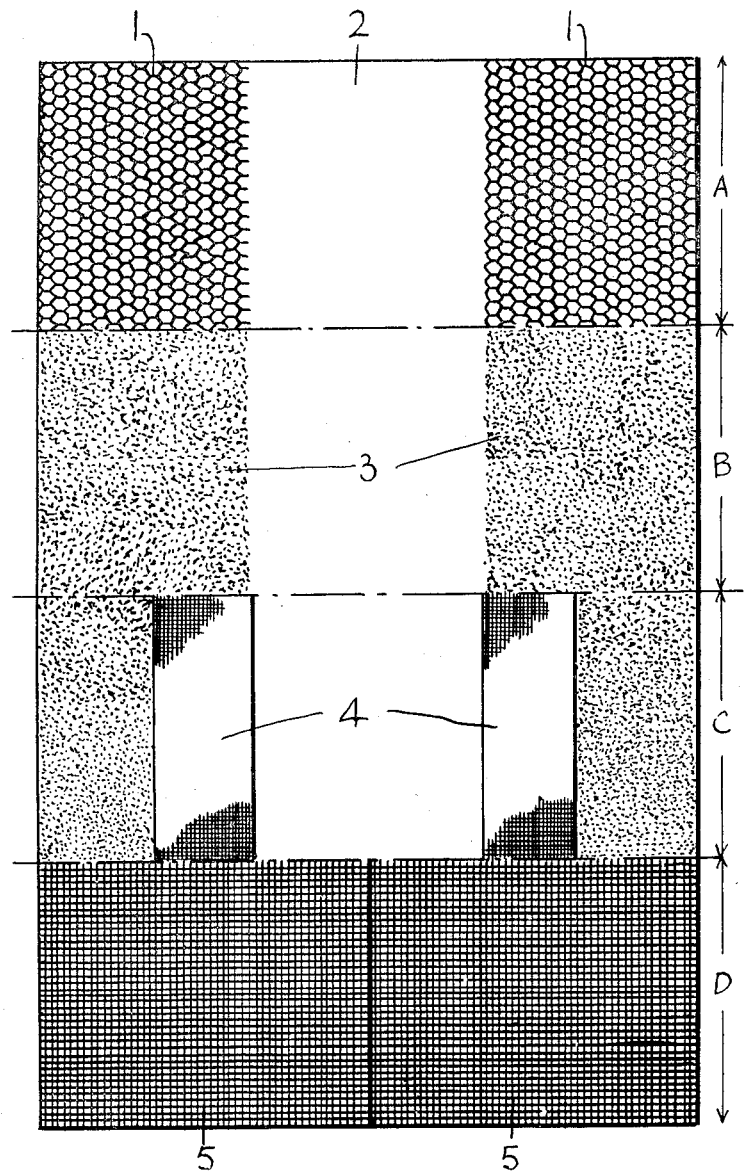

2,750,942

SURGICAL DRESSINGS

John Percy Robson, Leicester, England, assignor to Dalmas Limited, Leicester, England, a British company Application March 23, 1954, Serial No. 418,142

Claims priority, application Great Britain March 12, 1954

2 Claims. (Cl. 128—156)

This invention relates to surgical dressings, in particular those which comprise a transparent non-adherent portion.

It has already been proposed to make a surgical dressing of a transparent film to two opposite marginal edges of which layers of adhesive are applied, leaving a strip of the film in the middle through which a wound may be inspected so that the progress of healing of the same may be observed.

Such dressings may be used, for example, for application to wounds following surgical operations, the central transparent portion of the dressing being located over the wound so that the latter may be inspected without removal of the dressing. Provided the healing of the wound proceeds normally, the dressing need not be removed until the wound has completely healed.

The use of such dressings renders unnecessary the frequent removal of the same and this results not only in economy in dressings but in the avoidance of pain to the patient during such removal.

The film used in the preparation of such dressings may be made from any suitable plastic material.

Films of these materials are attended by the drawback that they have insufficient strength to withstand heavy and prolonged wear and in particular, where metal clips have been used to suture the wound, there is a likelihood that tearing of the thin plastic film may result.

It is an object of the present invention to obviate the said drawback and to provide a surgical dressing which will withstand wear and the conjoint use of metal clips.

It is a further object of this invention to provide a surgical dressing having an adhesive layer which remains firmly keyed to said dressing.

With these objects in view, the present invention mainly consists in a surgical dressing comprising a rectangular transparent non-adherent film having a strip of net material embedded in said film along two opposite marginal edges thereof and a self-adhesive mass spread on the surface of the film over an area substantially coextensive in the net material. This leaves the center portion of the dressing with its transparent sheet unimpaired so that the progress of healing of a wound beneath the dressing can be observed. Preferably, a strip of absorbent material is applied to the self-adhesive mass along the inner sides of the mentioned marginal edges which may be impregnated with antiseptic. Preferably, the net material or reinforcing mass of fibrous material projects exteriorly from one side of the transparent film.

A surgical dressing is illustrated in the accompanying drawing which is subdivided into four portions to show more readily the essential and optional components of the dressing.

The surgical dressing according to this invention shown in the drawing consists of a rectangular strip of transparent non-adherent film having net material 1 embedded along two opposite marginal edges of the strip and leaving a transparent portion or "window" 2 in the centre. The net material 1 is embedded in the film during its production, for example by casting, and the thickness of the film and the thickness of the net material are so correlated that the net material protrudes slightly from the surface of the film on the upper surface as viewed in the drawing. The dressing at this stage of its manufacture is shown in the uppermost portion of the drawing, A.

The second portion B of the drawing shows the dressing of a portion A after a self-adhesive mass 3 has been spread continuously or discontinuously thereon over an area substantially coextensive with the net material 1.

If desired, as shown in the third portion C of the drawing, a strip of absorbent material 4 may be pressed onto the adhesive 3 along one or both sides of the "window" 2, and held in position by the adhesive 3. The strip 4 may consist of a single thickness of lint, or two or more thicknesses rolled into a pad, and may if desired be impregnated with antiseptic. The strip 4 serves to absorb moisture from the skin and exudation from wounds.

As shown in the fourth portion D of the drawing, the dressing of portion B or C may be covered with a protective muslin 5. The protective muslin 5 may be in a single piece covering the whole surface of the dressing or may preferably be in two pieces which overlap slightly at the middle, as shown.

It is found that the embedded net material 1 strengthens the marginal edges of the dressing and that the protruding net material forms an effective key for the self-adhesive mass 3, thereby minimising the tendency for the adhesive to be pulled off with the protective muslin 5 when the latter is removed.

What I claim is:

1. A surgical dressing comprising a rectangular transparent non-adherent film having a strip of net material imbedded in said film along two opposite marginal edges thereof, a self-adhesive mass spread on the surface of the film over an area substantially coextensive with said net material, and a strip of absorbent material applied to said self-adhesive mass along the inner sides of said marginal edges.

2. A surgical dressing comprising in combination a substantially rectangular sheet of transparent material; a reinforcing mesh of fibrous material located in end portions of the sheet and defining a transparent sheet portion between said end portions, said mesh projecting exteriorly from one side of the sheet; adhesive adhered to each end of the sheet, said adhesive being applied to the projecting mesh and being substantially co-extensive in area therewith; and absorbent material being located at the inner margins of the adhesive area adjacent said transparent sheet portion.

References Cited in the file of this patent

UNITED STATES PATENTS

| 2,221,758 | Elmquist | Nov. 19, 1940 |
| 2,273,873 | Klein | Feb. 24, 1942 |
| 2,421,193 | Gardner | May 27, 1947 |

FOREIGN PATENTS

| 648,733 | Great Britain | Jan. 10, 1951 |